US008928180B2

(12) United States Patent
Chen et al.

(10) Patent No.: US 8,928,180 B2

(45) Date of Patent: Jan. 6, 2015

(54) POWER SUPPLY CIRCUIT

(75) Inventors: Liang Chen, Shenzhen (CN); Wei Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 608 days.

(21) Appl. No.: 13/294,766

(22) Filed: Nov. 11, 2011

(65) Prior Publication Data

US 2012/0119716 A1 May 17, 2012

(30) Foreign Application Priority Data

Nov. 11, 2010 (CN) ............................ 201010540365

(51) Int. Cl.

*G05F 1/10* (2006.01)
*H02J 1/00* (2006.01)
*G05F 1/565* (2006.01)

(52) U.S. Cl.

CPC . *G05F 1/565* (2013.01); *G05F 1/10* (2013.01)
USPC .......................................................... 307/103

(58) Field of Classification Search

CPC ................................... G05F 1/10; G05F 1/565
USPC .......................................................... 307/103
See application file for complete search history.

(56) References Cited

U.S. PATENT DOCUMENTS

| | | | |
|---|---|---|---|
| 2007/0241731 A1 | 10/2007 | van Ettinger | |
| 2010/0127670 A1 | 5/2010 | Chen et al. | |

FOREIGN PATENT DOCUMENTS

| | | |
|---|---|---|
| CN | 101377688 A | 3/2009 |
| CN | 101714817 | 5/2010 |
| CN | 101728840 A | 6/2010 |
| JP | 2006338665 A | 12/2006 |

OTHER PUBLICATIONS

Chinese Patent CN101714817 (Wu et al.), May 26, 2010, English Translation, obtained Jul. 11, 2014.*

Translation of First Chinese Office Action dated Dec. 29, 2011 as issued in connection with Chinese Patent Application No. 201010540365.5.

* cited by examiner

*Primary Examiner* — Hal Kaplan

(57) ABSTRACT

A power supply circuit is disclosed in embodiments of the present invention, which includes: a voltage output device, configured to generate an output voltage; a parasitic resistance, connected between an output end of the voltage output device and an external load, where two ends of the parasitic resistance generate a voltage drop; and a compensation circuit, connected to the output end of the voltage output device and configured to generate a compensation voltage, where the compensation voltage is loaded onto the voltage output device, so as to offset the voltage drop generated by the parasitic resistance, so that a voltage obtained at an input end of the load is roughly equal to the output voltage generated by the voltage output device. The circuit is applicable to improving load regulation of a power supply.

4 Claims, 7 Drawing Sheets

POWER SUPPLY CIRCUIT

CROSS-REFERENCE TO RELATED APPLICATIONS

This application claims priority to Chinese Patent Application No. 201010540365.5, filed on Nov. 11, 2010, which is hereby incorporated by reference in its entirety.

FIELD OF THE INVENTION

The present invention relates to the field of circuit technologies, and in particular, to a power supply circuit.

BACKGROUND OF THE INVENTION

Generally, all chip packages have a bonding wire, chip packages that adopt substrates also have substrate wiring, and for chips adopting other packages, other wiring for connection inevitably exists from a chip bonding pad to an external path of the chip. The bonding wire, the substrate wiring, and other wiring for connection all have a parasitic wiring resistance.

For a power supply chip, because the power supply chip has multiple outputs, and each output carries a large load output current, a parasitic resistance caused by a package and wiring on a Printed Circuit Board (PCB) generates a relatively large voltage drop. With the increase of an output current, the parasitic resistance linearly generates a larger voltage drop, therefore, load regulation of the power supply chip is seriously affected, resulting in a deviation from a desired rated output voltage.

In order to improve the load regulation of the power supply chip, in the prior art, multiple bonding wires connected in parallel are used, or a single bonding wire or a single chip pin is used as a feedback wire, so as to effectively reduce an effect of the bonding wire and the substrate wiring on the output voltage, and further improve the load regulation of the power supply chip.

In the implementation of the present invention, the inventor finds that the prior art has at least the following problems.

When the load regulation of the power supply chip is improved, the number of the bonding wires of the power supply chip or additional chip pins may be increased, so that the cost of the power supply chip is increased.

SUMMARY OF THE INVENTION

Embodiments of the present invention provide a power supply circuit, so as to improve load regulation of a power supply.

A power supply circuit provided in the present invention includes: a voltage output device, configured to generate an output voltage; a parasitic resistance, connected between an output end of the voltage output device and an external load, where two ends of the parasitic resistance generate a voltage drop; and a compensation circuit, connected to the output end of the voltage output device and configured to generate a compensation voltage, where the compensation voltage is loaded onto the voltage output device to offset the voltage drop generated by the parasitic resistance, so that a voltage obtained at an input end of the load is roughly equal to the output voltage generated by the voltage output device.

With the power supply circuit according to the embodiments of the present invention, the compensation voltage is generated, and then is loaded onto the voltage output device to offset the voltage drop generated by the parasitic resistance, so that the voltage obtained at the input end of the load is roughly equal to the output voltage generated by the voltage output device, therefore, the load regulation of the power supply circuit is improved, and the cost of the power supply chip is reduced.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description are only some embodiments of the present invention, and persons of ordinary skill in the art may also derive other drawings from these accompanying drawings without creative efforts.

DETAILED DESCRIPTION OF THE EMBODIMENTS

The technical solutions in the embodiments of the present invention are clearly and fully described in the following with reference to the accompanying drawings in the embodiments of the present invention. Obviously, the embodiments to be described are only a part rather than all of the embodiments of the present invention. Based on the embodiments of the present invention, all other embodiments obtained by persons of ordinary skill in the art without creative efforts shall fall within the protection scope of the present invention.

In order to make the advantages of the technical solutions in the present invention more clearly, the present invention is described in further detail in the following with reference to the accompanying drawings and embodiments.

Figure 1A:
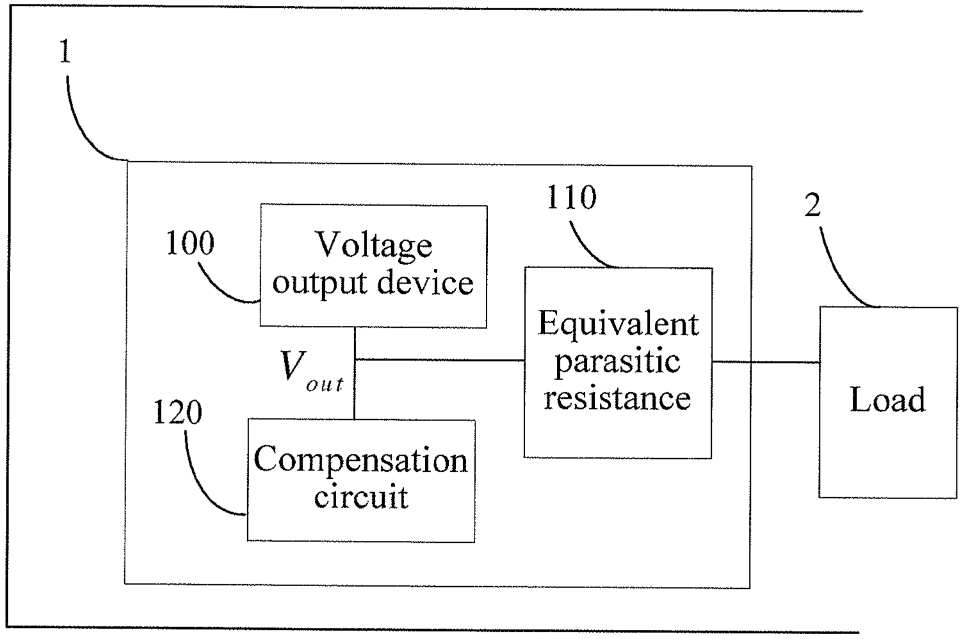
FIG. 1*a* and FIG. 1*b* are schematic structural diagrams of a device according to an embodiment of the present invention.

Referring to FIG. 1*a*, this embodiment provides a power supply circuit 1, so as to improve load regulation, and reduce an effect that a large deviation from a desired rated output voltage is caused because a load is loaded onto the power supply circuit. As shown in FIG. 1, the power supply circuit 1 includes a voltage output device 100, an equivalent parasitic resistance 110 connecting the voltage output device 100 and an external load 2, and a compensation circuit 120. The voltage output device 100 is configured to generate an output voltage $V_{out}$. Two ends of the equivalent parasitic resistance 110 generate a voltage drop, and an output voltage of the power supply circuit 1 deviates from the output voltage $V_{out}$. It can be understood that, in the power supply circuit 1, the equivalent parasitic resistance 110 may be understood as impedance caused by a chip package and PCB wiring between an actual voltage generation circuit and the external load 2.

The compensation circuit 120 is connected to an output end of the voltage output device 100, and is configured to generate a compensation voltage. The compensation voltage is loaded onto the output end of the voltage output device 100 to offset the voltage drop generated by the parasitic resistance 110, so that a voltage obtained at an input end of the load is roughly equal to the output voltage generated by the voltage output device. It can be understood that, "roughly equal" here may be understood that the voltage obtained at the input end of the load is equal to or approximately equal to the output voltage $V_{out}$, and "approximately equal" may be considered as being equal within a certain range, for example, varying with a range of ±20%. In this embodiment of the present invention, the output end of the voltage output device 100 is connected to the compensation circuit 120, and the compensation voltage is loaded onto the output end of the voltage output device 100 through the compensation circuit 120, and then, an output end of the power supply circuit 1 may obtain an output voltage after the voltage drop caused by the parasitic resistance 110 is offset, so that the load regulation of the power supply circuit 1 is improved and the cost of the power supply chip is reduced. It can be understood that, the compensation circuit 120 here may be directly or indirectly connected to the voltage output device through various electrical connection manners such as coupling.

To facilitate the description, the output voltages $V_{out}$ mentioned in the embodiments of the present specification all refer to voltages that are generated at the output end of the voltage output device 100 and are not affected by the compensation circuit 120 and the parasitic resistance. Actually, a voltage generated at the output end of the voltage output device 100 is a sum of the output voltage $V_{out}$, the voltage provided by the compensation circuit 120 and the voltage provided by the equivalent parasitic resistance.

Figure 1B:
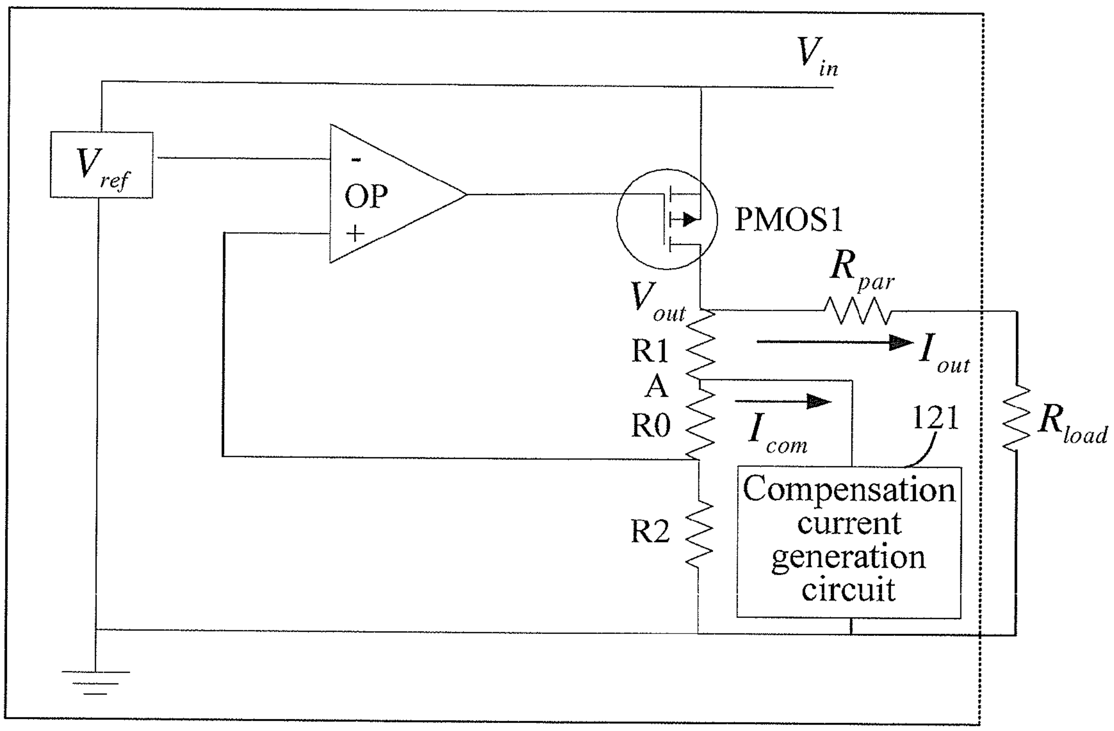

Referring to FIG. 1*b*, in this embodiment of the present invention, a Low Dropout Regulator (LDO) may be taken as an example for description. In other accompanying drawings, a part within a dashed line block may represent the power supply circuit 1, or the power supply circuit 1 may be considered as the power supply chip. A total parasitic resistance on a bonding wire, substrate wiring, and other wiring for connection inside the power supply chip may be considered as the equivalent parasitic resistance 110, that is, a parasitic resistance $R_{par}$. The compensation circuit includes a first resistance and a compensation current generation circuit. The first resistance is connected between the output end of the voltage output device and the compensation current generation circuit, where the compensation current generation circuit is configured to generate a compensation current having a first proportional relation with a current flowing through the parasitic resistance, and the compensation current generates the compensation voltage after flowing through the first resistance; and according to a second proportional relation between resistance values of the parasitic resistance and the first resistance, the compensation voltage is roughly equal to a voltage generated at two ends of the parasitic resistance.

In the power supply circuit 1 as shown in FIG. 1*b*, the external load connected to the power supply circuit 1 is $R_{load}$. The voltage output device 100 includes: a reference voltage $V_{ref}$ providing device, an operational amplifier OP and a first Positive-channel Metal Oxide Semiconductor (PMOS) transistor. The equivalent parasitic resistance 110 is $R_{par}$. The compensation circuit 120 includes: an optional resistance R0, a first resistance R1, a second resistance R2, and a compensation current generation circuit 121. The compensation current generation circuit 121 is configured to generate a compensation current having a first proportional relation with a current flowing through the parasitic resistance $R_{par}$, and the compensation current generates the compensation voltage after flowing through the first resistance R1, so that according to a preset second proportional relation between resistance values of the parasitic resistance $R_{par}$ and the first resistance R1, the compensation voltage is roughly equal to the voltage generated at the two ends of the parasitic resistance $R_{par}$.

The operational amplifier OP includes a positive input end, a negative input end and an output end. A source electrode of the first PMOS transistor is connected to a power supply voltage $V_{in}$, a grid electrode of the first PMOS transistor (PMOS1) is connected to the output end of the operational amplifier OP, and a drain electrode of the first PMOS transistor (PMOS1) provides an output voltage $V_{out}$. The negative input end of the operational amplifier OP is connected to the reference voltage $V_{ref}$ providing device so as to receive a reference voltage $V_{ref}$; the optional resistance R0 and the first resistance R1 are sequentially connected in series between the positive input end of the operational amplifier OP and the drain electrode of the first PMOS transistor (PMOS1), so that the operational amplifier OP forms a negative feedback loop; and the positive input end of the operational amplifier OP is grounded through the second resistance R2. The drain electrode of the first PMOS transistor is connected to the external load $R_{load}$ through the parasitic resistance $R_{par}$. It is assumed that the current flowing through the parasitic resistance $R_{par}$ is $I_{out}$. The resistance value of the parasitic resistance $R_{par}$ may be obtained through various manners such as pretest or pre-estimation, which are not described here again. One end of the compensation current generation circuit 121 is connected to a connection end point A of the resistance R1 and the optional resistance R0, and the other end is grounded. The compensation current generation circuit 121 generates a compensation current $I_{com}$, so that $I_{com}$ is changed in direct proportion to an output current $I_{out}$, and a value of $I_{com}$ is equal to $I_{out} \times R_{par}/R1$. Because a value of $V_{ref}$ is not changed in the negative feedback loop of the operational amplifier OP, a current flowing through the optional resistance R0 is also not changed. It can be understood that, when the compensation current generation circuit 121 is not added and the parasitic resistance $R_{par}$ is not considered, the drain electrode of the first PMOS transistor (PMOS1) outputs the voltage $V_{out}$; and after the compensation current generation circuit 121 is added, the voltage obtained by the drain electrode of the PMOS transistor is $V_{out}+R1 \times I_{com}$. Because the value of $I_{com}$ is equal to $I_{out} \times R_{par}/R1$, a voltage value of the drain electrode of the PMOS transistor is increased to $V_{out}+I_{out} \times R_{par}$. When a factor of the parasitic resistance $R_{par}$ is further considered, even if the parasitic resistance $R_{par}$ generates a voltage drop $I_{out} \times R_{par}$, the voltage value of the drain electrode of the PMOS transistor increased through the function of the compensation circuit (here mainly refers to the compensation current generation circuit 121 and the resistance R1) is equal to the voltage drop generated by the two ends of $R_{par}$. Therefore, a voltage of an input load $R_{load}$ is equal to a desired rated voltage $V_{out}$, and the effect of the parasitic resistance $R_{par}$ is reduced, so that the load regulation of the power supply circuit is improved and the cost of the power supply chip is reduced.

Figure 2A:
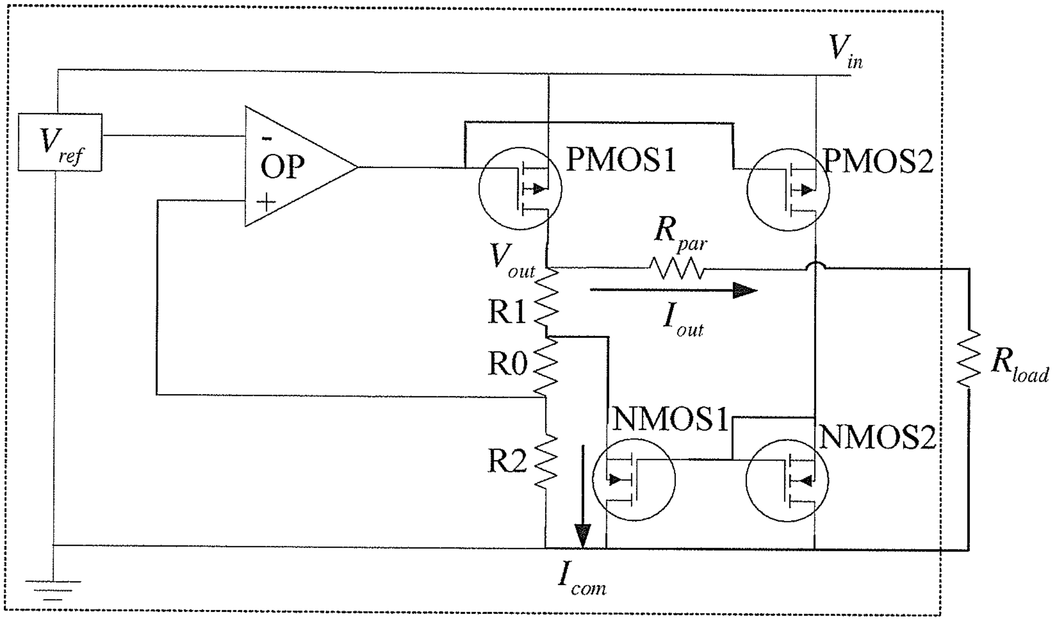
FIG. 2*a* and FIG. 2*b* are schematic structural diagrams of a device according to an embodiment of the present invention.
Figure 2B:
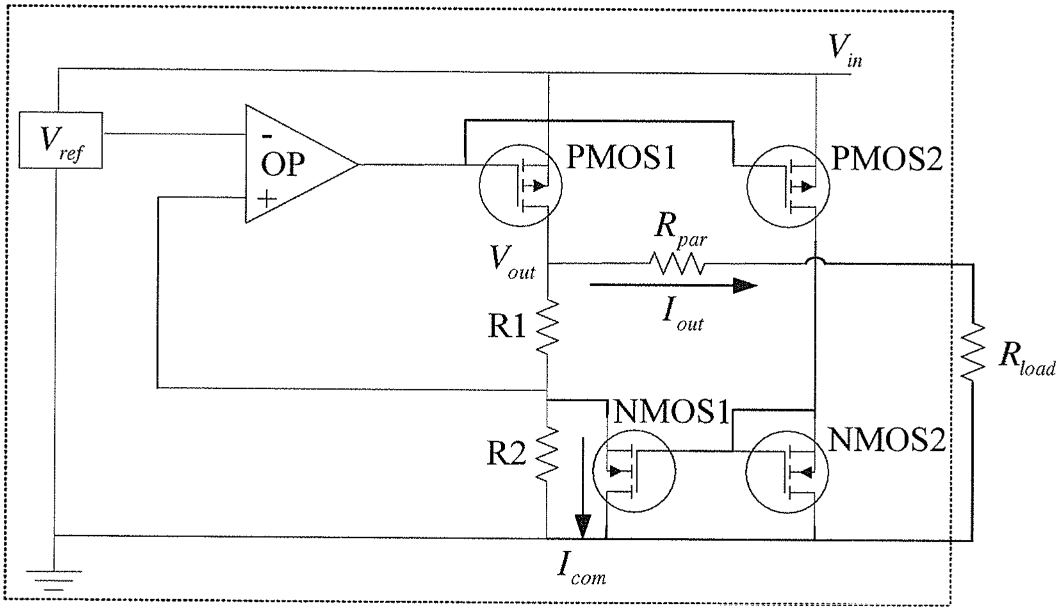

As shown in FIG. 2*a* and FIG. 2*b*, this embodiment provides another power supply circuit, and in this embodiment, a compensation circuit 120 may further include: a second PMOS transistor, a first Negative-channel Metal Oxide Semiconductor (NMOS) transistor and a second NMOS transistor. A first PMOS transistor, the second PMOS transistor, the first NMOS transistor and the second NMOS transistor all work in a transistor saturation area. A positive input end of an operational amplifier OP is connected to a drain electrode of the first PMOS transistor (PMOS1) through an optional resistance R0 and a first resistance R1 connected in series, and optionally, may be connected to the drain electrode of the first PMOS transistor (PMOS1) directly through R1. The positive input end of OP is grounded through a second resistance R2, a negative input end of OP inputs a reference voltage $V_{ref}$, an output end of OP is connected to a grid electrode of the first PMOS transistor (PMOS1), and a source electrode of the first PMOS transistor (PMOS1) receives an input power supply voltage $V_{in}$. The drain electrode of the first PMOS transistor (PMOS1) is connected to an external load $R_{load}$ through a parasitic resistance $R_{par}$, so as to provide an output current $I_{out}$ for the load $R_{load}$.

The second PMOS transistor (PMOS2) and the first PMOS transistor (PMOS1) form a current mirror and work in the transistor saturation area. A grid electrode of the second PMOS transistor (PMOS2) is connected to the grid electrode of the first PMOS transistor (PMOS1), and a source electrode of the second PMOS transistor (PMOS2) is connected to the source electrode of the first PMOS transistor (PMOS1). A drain electrode of the second PMOS transistor (PMOS2) is connected to a source electrode of the second NMOS transistor (NMOS2).

The first NMOS transistor (NMOS1) and the second NMOS transistor (NMOS2) form a current mirror. A source electrode of the first NMOS transistor (NMOS1) is connected to the drain electrode of the first PMOS transistor (PMOS1) through the resistance R1, a drain electrode of the first NMOS transistor (NMOS1) is grounded, and a grid electrode of the first NMOS transistor (NMOS1) is connected to a grid electrode of the second NMOS transistor (NMOS2). A drain electrode of the second NMOS transistor (NMOS2) is also grounded. A width-to-length ratio of the second PMOS transistor (PMOS2) is K times a width-to-length ratio of the first PMOS transistor (PMOS1), and therefore, a drain-source current flowing through the second PMOS transistor (PMOS2) is K times a drain-source current flowing through the first PMOS transistor (PMOS1). The drain-source current flowing through the first PMOS transistor (PMOS1) is equal to a sum of the current $I_{out}$ flowing through the load $R_{load}$ and the current flowing through the resistance R1. In an actual power supply circuit, the current $I_{out}$ of the load required to be output is much greater than the current flowing through the resistance R1, so that a value of the drain-source current flowing through the first PMOS transistor (PMOS1) is approximately equal to a value of the current $I_{out}$ flowing through the load $R_{load}$. Therefore, the drain-source current flowing through the second PMOS transistor (PMOS2) is $K \times I_{out}$. A width-to-length ratio of the first NMOS transistor (NMOS1) is J times a width-to-length ratio of the second NMOS transistor (NMOS2), and therefore, a drain-source current flowing through the first NMOS transistor (NMOS1) is J times a drain-source current flowing through the second NMOS transistor (NMOS2). The drain-source current flowing through the second PMOS transistor (PMOS2) is equal to the drain-source current flowing through the second NMOS transistor (NMOS2), and therefore, the drain-source current flowing through the first NMOS transistor (NMOS1) is K×J times the current flowing through the first PMOS transistor (PMOS1), that is, $K \times J \times I_{out}$. It is set that $J \times K = R_{par}/R1$, where J and K are natural numbers, $R_{par}$ is the resistance value of the parasitic resistance $R_{par}$, and R1 is the resistance value of the first resistance. It can be known from a circuit analysis that, after a compensation circuit is added, and when an effect of the parasitic resistance $R_{par}$ is not considered, a drain voltage of the first PMOS transistor (PMOS1) is as follows:

$$V_{ref} \times [(R1+R0)/R2] + V_{ref} + J \times K \times I_{out} \times R1.$$

After the compensation circuit is added, an increased value of the drain voltage of the first PMOS transistor (PMOS1) is $K \times J \times I_{out} \times R1$. $J \times K = R_{par}/R1$ may be preset, and therefore, after the compensation circuit is added, the drain voltage of the first PMOS transistor (PMOS1) is increased by $I_{out} \times R_{par}$. The effect of the parasitic resistance $R_{par}$ is further considered, because the voltage drop generated by the parasitic resistance $R_{par}$ is also $I_{out} \times R_{par}$, the increased value of the drain voltage of the first PMOS transistor (PMOS1) after the compensation circuit is added is equal to the voltage drop generated by the parasitic resistance $R_{par}$. Therefore, the input voltage of the load $R_{load}$ is an actual desired rated voltage $V_{out}$, that is, $V_{ref} \times [(R1+R0)/R2] + V_{ref}$. It can be seen that, after the compensation circuit is added, the effect of the parasitic resistance $R_{par}$ on the load regulation is reduced.

In comparison with FIG. 2*a*, FIG. 2*b* does not include the optional resistance R0. Therefore, when the compensation circuit is added, and the effect of the parasitic resistance $R_{par}$ is not considered, the drain voltage of the first PMOS transistor (PMOS1) is: $V_{ref} \times (R1/R2) + V_{ref} + J \times K \times I_{out} \times R1$. Because it is preset that $J \times K = R_{par}/R1$, it can be seen that, after the compensation circuit is added, the value of the drain voltage of the first PMOS transistor (PMOS1) is increased by $I_{out} \times R_{par}$. When the effect of the parasitic resistance $R_{par}$ is further considered, the voltage drop generated by $R_{par}$ is $I_{out} \times R_{par}$. After a voltage provided by the compensation circuit is offset by the voltage drop of the parasitic resistance $R_{par}$, the voltage input of the load $R_{load}$ is $V_{ref} \times (R1/R2) + V_{ref}$. It can be seen that, after the compensation circuit is added, the effect of the parasitic resistance $R_{par}$ on the load regulation is reduced.

In the power supply circuit disclosed by this embodiment of the present invention, the output voltage is increased through the compensation circuit added inside the power supply circuit, so as to compensate for the voltage drop generated by the parasitic resistance, so that the load regulation of the power supply can be increased without increasing the cost of the power supply chip, therefore, the cost of the power supply chip is reduced.

Figure 3A:
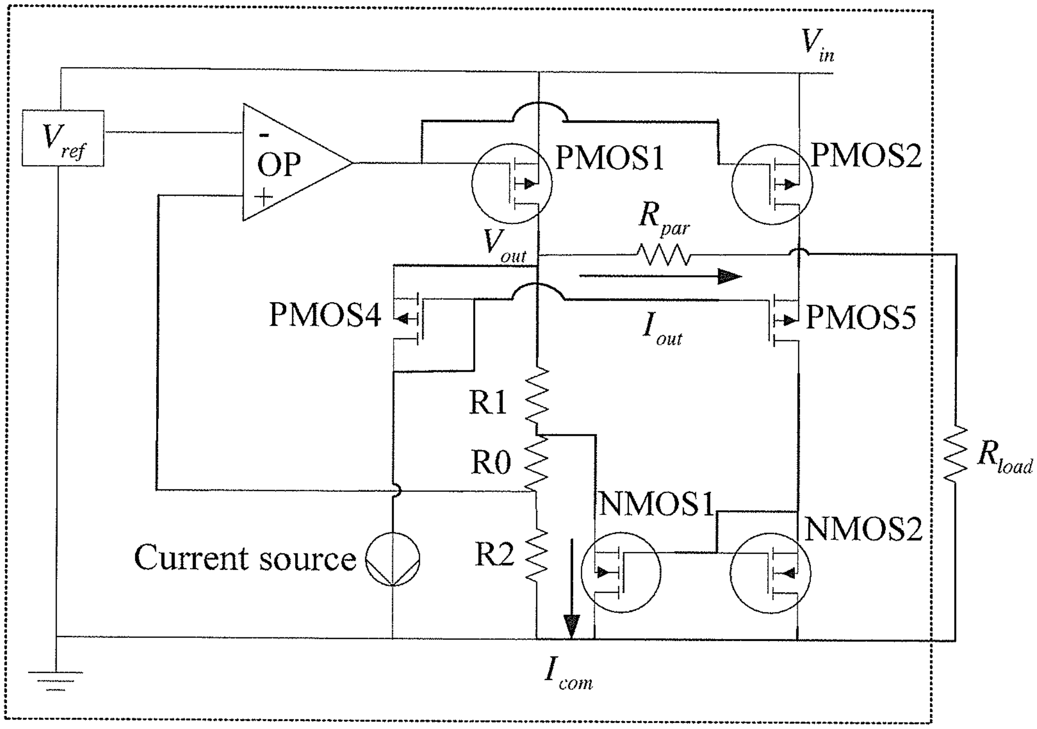
FIG. 3*a* and FIG. 3*b* are schematic structural diagrams of a device according to another embodiment of the present invention.

As shown in FIG. 3*a*, this embodiment provides a power supply circuit 1, where a first PMOS transistor (PMOS1) and a second PMOS transistor (PMOS2) work in a transistor linear area. Compared with FIG. 2*a*, in the embodiment shown in FIG. 3*a*, a fourth PMOS transistor (PMOS4) and a current source are further connected in parallel between a drain electrode of the first PMOS transistor (PMOS1) and the ground, and a drain electrode of the first PMOS transistor (PMOS1) is connected to a source electrode of the fourth PMOS transistor (PMOS4). A PMOS5 is further connected in parallel between a drain electrode of the second PMOS transistor (PMOS2) and a second NMOS transistor (NMOS2), and the drain electrode of the second PMOS transistor (PMOS2) is connected to the source electrode of the fourth PMOS transistor (PMOS4). A grid electrode of the fourth PMOS transistor (PMOS4) is connected to a grid electrode of the PMOS5. In the same way, it can be understood that, in this embodiment, a positive input end of an operational amplifier OP is connected to the drain electrode of the first PMOS transistor (PMOS1) through an optional resistance R0 connected in series with R1 or through R1, and the positive input end of OP is grounded through R2; and a negative input end of OP is connected to a reference voltage $V_{ref}$, an output end of OP is connected to a grid electrode of the first PMOS transistor (PMOS1), a source electrode of the first PMOS transistor (PMOS1) is connected to a power supply voltage $v_{in}$, and the drain electrode of the first PMOS transistor (PMOS1) outputs a voltage to a load through a parasitic resistance $R_{par}$. It can be understood that, the drain electrode of the second PMOS transistor (PMOS2) is connected to a source electrode of the PMOS5, a drain electrode of the PMOS5 is connected to a source electrode of the second NMOS transistor (NMOS2), the drain electrode of the first PMOS transistor (PMOS1) is connected to the source electrode of the fourth PMOS transistor (PMOS4), a drain electrode of the fourth PMOS transistor (PMOS4) is grounded through the current source, and the grid electrode of the PMOS5 is connected to the grid electrode and the drain electrode of the fourth PMOS transistor (PMOS4). Therefore, the fourth PMOS transistor (PMOS4) and the PMOS5 form a current mirror to ensure that a drain voltage of the first PMOS transistor (PMOS1) is roughly equal to a drain voltage of the second PMOS transistor (PMOS2), so that voltages at the grid electrode, the source electrode and the drain electrode of the first PMOS transistor (PMOS1) are equal to that of the second PMOS transistor (PMOS2), thus ensuring that the second PMOS transistor (PMOS2) may mirror a current of the first PMOS transistor (PMOS1).

The drain electrode of the PMOS5 is connected to the source electrode of the second NMOS transistor (NMOS2), a first NMOS transistor (NMOS1) and the second NMOS transistor (NMOS2) form a current mirror, and a source electrode of the first NMOS transistor (NMOS1) generates a compensation voltage and provides the compensation voltage to the drain electrode of the first PMOS transistor (PMOS1) through R1, where, it is assumed that a width-to-length ratio of the second PMOS transistor (PMOS2) is K times a width-to-length ratio of the first PMOS transistor (PMOS1), therefore, a current flowing through the second PMOS transistor (PMOS2) is K times a current flowing through the first PMOS transistor (PMOS1). In the same way, because a value of a drain-source current flowing through the first PMOS transistor (PMOS1) may be approximately $I_{out}$, the current flowing through the second PMOS transistor (PMOS2) is $K\times I_{out}$. It is assumed that a width-to-length ratio of the first NMOS transistor (NMOS1) is J times a width-to-length ratio of the second NMOS transistor (NMOS2), a current flowing through the first NMOS transistor (NMOS1) is J times a current flowing through the second NMOS transistor (NMOS2), and because the current flowing through the second PMOS transistor (PMOS2) is equal to the current flowing through the second NMOS transistor (NMOS2), the current flowing through the first NMOS transistor (NMOS1) is K×J times the current flowing through the first PMOS transistor (PMOS1), that is, $K\times J\times I_{out}$. It is preset that $J\times K=R_{par}/R1$, where $R_{par}$ may be pre-measured.

As shown in FIG. 3*a*, after a compensation circuit is added, and an effect of the parasitic resistance $R_{par}$ is not considered, the drain voltage of the first PMOS transistor (PMOS1) is equal to: $V_{ref}\times[(R1+R0)/R2]+V_{ref}+J\times K\times I_{out}\times R1$. Because $J\times K=R_{par}/R1$, it can be seen that, an increased value of the voltage provided by the compensation circuit is $I_{out}\times R_{par}$. When the effect of the parasitic resistance $R_{par}$ is further considered, obviously, a voltage drop generated by $R_{par}$ is $I_{out}\times R_{par}$. Therefore, at the drain electrode end of the first PMOS transistor (PMOS1), the increased value of the voltage provided by the compensation circuit is equal to the voltage drop generated by $R_{par}$, and then an actual input voltage of the $R_{load}$ is $V_{ref}\times[(R1+R0)/R2[+V_{ref}$. It can be seen that, after the compensation circuit is added, the effect of the parasitic resistance $R_{par}$ on load regulation is reduced.

Figure 3B:
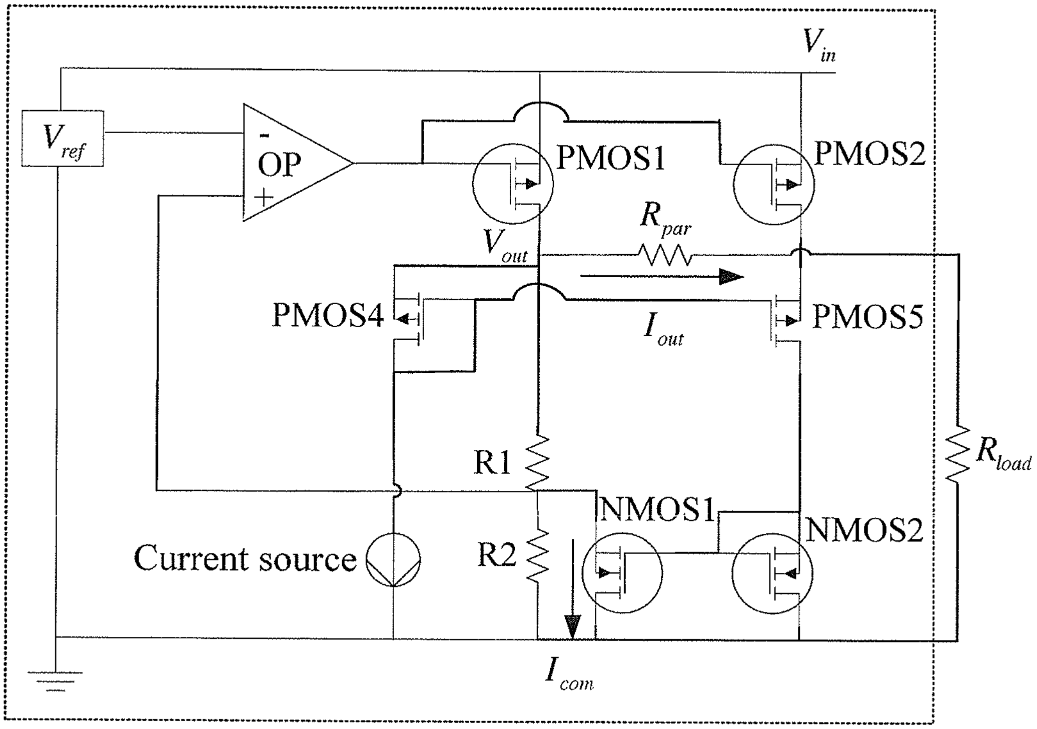

In comparison with FIG. 3*a*, FIG. 3*b* dose not include the optional resistance R0. After the compensation circuit is added, and the effect of the parasitic resistance $R_{par}$ is not considered, the drain voltage of the first PMOS transistor (PMOS1) is: $V_{ref}\times(R1/R2)+V_{ref}+J\times K\times I_{out}\times R1$. It is preset that $J\times K=R_{par}/R1$, and therefore, after the compensation circuit is added, the value of the drain voltage of the first PMOS transistor (PMOS1) is increased by $I_{out}\times R_{par}$. The voltage drop actually generated by $R_{par}$ is $I_{out}\times R_{par}$, and it can be seen that, the increased value of the drain voltage of the first PMOS transistor (PMOS1) is equal to the voltage drop generated by $R_{par}$. If a voltage of the load $R_{load}$ is $V_{ref}\times(R1/R2)+V_{ref}$, the effect of the parasitic resistance $R_{par}$ on the load regulation may be reduced. In this way, the load regulation of the power supply can be improved without increasing the cost of the power supply chip.

Figure 4A:
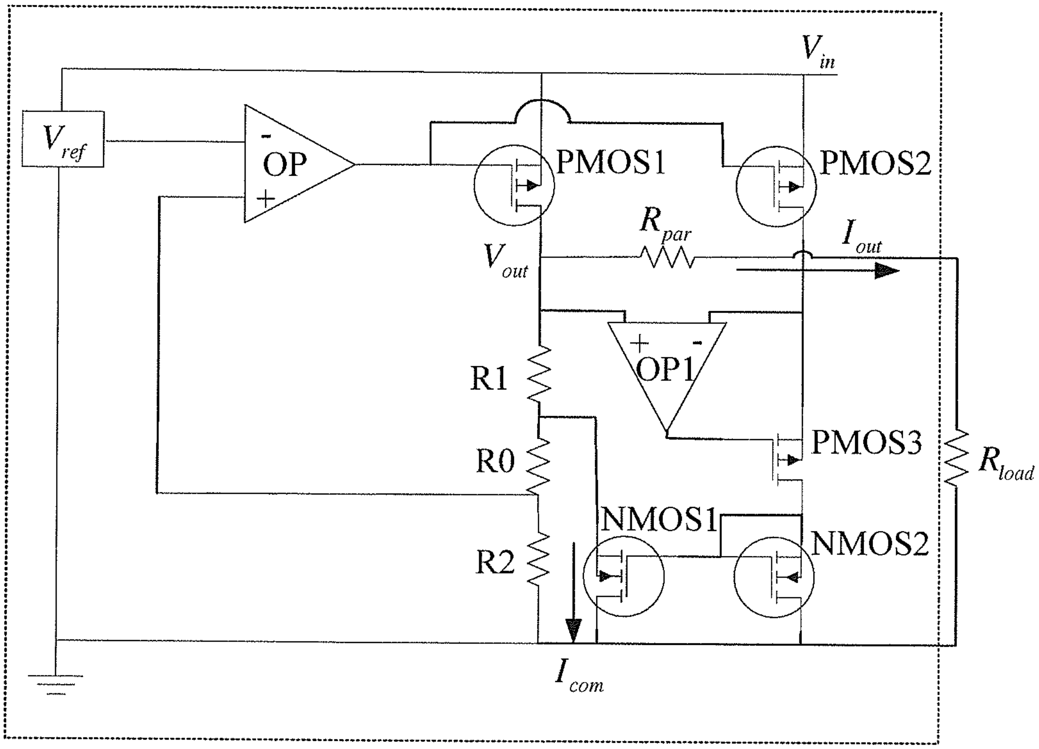
FIG. 4*a* and FIG. 4*b* are schematic structural diagrams of a device according to another embodiment of the present invention.

Different from FIG. 2*a*, in a power supply circuit as shown in FIG. 4*a*, a first PMOS transistor (PMOS1) and a second PMOS transistor (PMOS2) work in a linear area. In order to ensure that a drain voltage of the first PMOS transistor (PMOS1) is roughly equal to a drain voltage of the second PMOS transistor (PMOS2), a clamping voltage circuit is introduced between a drain electrode of the first PMOS transistor (PMOS1) and a drain electrode of the second PMOS transistor (PMOS2). In this embodiment, the clamping voltage circuit uses an operational amplifier feedback circuit to implement a clamping voltage function, which specifically includes an operational amplifier OP1 and a third PMOS transistor. The drain electrode of the first PMOS transistor (PMOS1) is connected to a positive input end of the operational amplifier OP1, and the drain electrode of the second PMOS transistor (PMOS2) is connected to a negative input end of OP1. A grid electrode of the third PMOS transistor (PMOS3) is connected to an output end of OP1, a source electrode of the third PMOS transistor (PMOS3) is connected to a drain electrode of a second NMOS transistor (NMOS2), and a drain electrode of the third PMOS transistor (PMOS3) is connected to a source electrode of the second NMOS transistor (NMOS2). Therefore, OP1 and the third PMOS transistor (PMOS3) form a negative feedback clamping circuit to ensure that the drain voltage of the first PMOS transistor (PMOS1) is roughly equal to the drain voltage of the second PMOS transistor (PMOS2), so that voltages at the grid electrode, the source electrode and the drain electrode of the first PMOS transistor (PMOS1) are equal to that of the second PMOS transistor (PMOS2), thus ensuring that the second PMOS transistor (PMOS2) may mirror a current of the first PMOS transistor (PMOS1) when the first PMOS transistor (PMOS1) and the second PMOS transistor (PMOS2) work in the linear area. Similarly, in this embodiment, the positive input end of the operational amplifier OP is connected to the drain electrode of the first PMOS transistor (PMOS1) through an optional resistance R0 connected in series with R1 or through R1, and the positive input end of the operational amplifier OP is grounded through R2; and the negative input end of OP is connected to a reference voltage $V_{ref}$, the output end of OP is connected to the grid electrode of the first PMOS transistor (PMOS1), a source electrode of the first PMOS transistor (PMOS1) is connected to an input voltage $V_{in}$, and the drain electrode of the first PMOS transistor (PMOS1) is connected to a parasitic resistance $R_{par}$, and outputs a voltage to a load. The drain electrode of the second PMOS transistor (PMOS2) is connected to the source electrode of the second NMOS transistor (NMOS2) through the third PMOS transistor (PMOS3), a first NMOS transistor (NMOS1) and the second NMOS transistor (NMOS2) form a current mirror, and a source electrode of the first NMOS transistor (NMOS1)

is connected to $V_{out}$ through R1. A width-to-length ratio of the second PMOS transistor (PMOS2) is K times a width-to length ratio of the first PMOS transistor (PMOS1), and therefore, a drain-source current flowing through the second PMOS transistor (PMOS2) is K times a drain-source current flowing through the first PMOS transistor (PMOS1). Because the drain-source current flowing through the first PMOS transistor (PMOS1) may approximately be $I_{out}$, the current flowing through the second PMOS transistor (PMOS2) is $K\times I_{out}$. Because a width-to-length ratio of the first NMOS transistor (NMOS1) is J times a width-to-length ratio of the second NMOS transistor (NMOS2), a drain-source current flowing through the first NMOS transistor (NMOS1) is J times a drain-source current flowing through the second NMOS transistor (NMOS2). The drain-source current flowing through the second PMOS transistor (PMOS2) is equal to the drain-source current flowing through the second NMOS transistor (NMOS2), therefore, the drain-source current flowing through the first NMOS transistor (NMOS1) is K×J times the drain-source current flowing through the first PMOS transistor (PMOS1), that is, $K\times J\times I_{out}$, and furthermore, $J\times K=R_{par}/R1$.

In FIG. 4*a*, after a compensation circuit is added, and an effect of the parasitic resistance $R_{par}$ is not considered, the drain voltage of the first PMOS transistor (PMOS1) is: $V_{ref}\times[(R1+R0)/R2]+V_{ref}+J\times K\times I_{out}\times R1$, and it is preset that $J\times K=R_{par}/R1$. Therefore, according to a compensation current provided through R1 and the first NMOS transistor (NMOS1), a value of a voltage output by the drain electrode of the first PMOS transistor (PMOS1) is increased by $I_{out}\times R_{par}$. Actually, due to the effect of the parasitic resistance $R_{par}$, a voltage drop generated by an input end of the load is $I_{out}\times R_{par}$, and therefore, after the increased voltage equal to the voltage drop generated by $R_{par}$ is offset, an input voltage of the load $R_{load}$ is $V_{ref}\times[(R1+R0)/R2]+V_{ref}$. It can be seen that, the effect of $R_{par}$ on the load regulation is reduced after the compensation circuit is introduced.

Figure 4B:
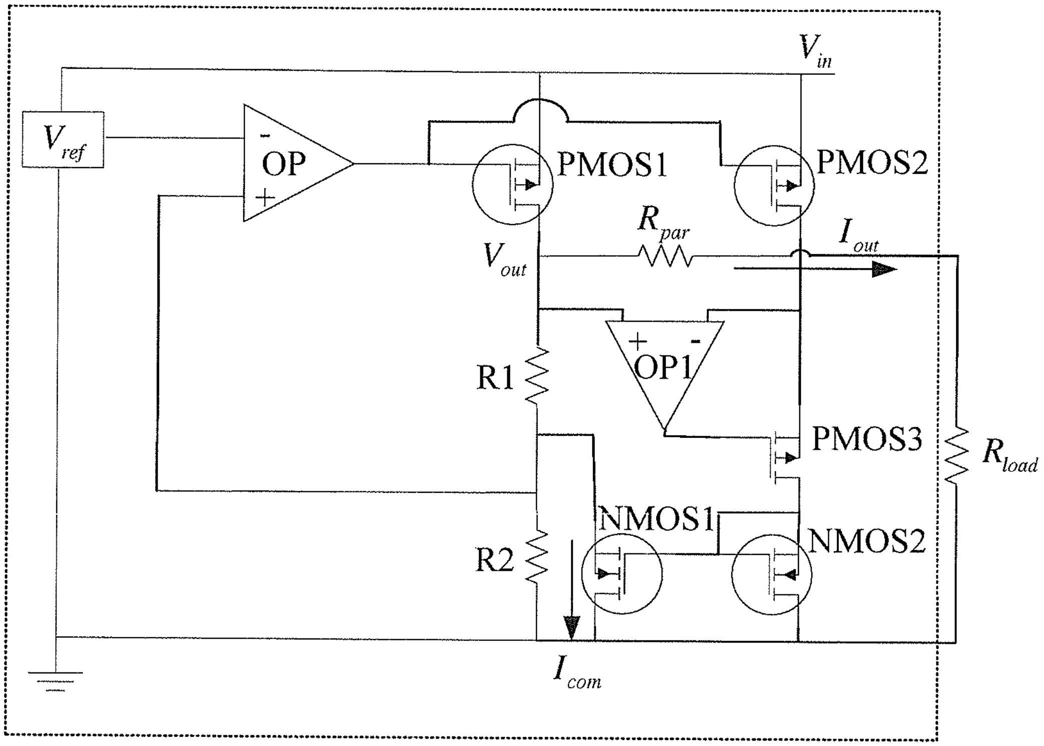

In comparison with FIG. 4*a*, FIG. 4*b* does not include the optional resistance R0. After the compensation circuit is added, and the effect of the parasitic resistance $R_{par}$ is not considered, the drain voltage of the first PMOS transistor (PMOS1) is: $V_{ref}\times(R1/R2)+V_{ref}+J\times K\times I_{out}\times R1$. Because $J\times K=R_{par}/R1$, after the compensation circuit is added, the value of the drain voltage of the first PMOS transistor (PMOS1) is increased by $I_{out}\times R_{par}$. Due to the effect of the actually existing parasitic resistance $R_{par}$, the voltage drop generated by $R_{par}$ is also $I_{out}\times R_{par}$. Therefore, after the compensation circuit is added, the increased value of the drain voltage of the first PMOS transistor (PMOS1) is equal to the voltage drop generated by $R_{par}$. It can be seen that, at this time, the voltage of the load $R_{load}$ is $V_{ref}\times(R1/R2)+V_{ref}$, so that the effect of $R_{par}$ on the load regulation is reduced.

With a device for improving the load regulation of the power supply according to this embodiment of the present invention, an output voltage is increased through a circuit added inside a power supply chip in this embodiment of the present invention, so as to compensate for the voltage drop generated by the parasitic resistance, so that the load regulation of the power supply can be improved without increasing the cost of the power supply chip.

Figure 5A:
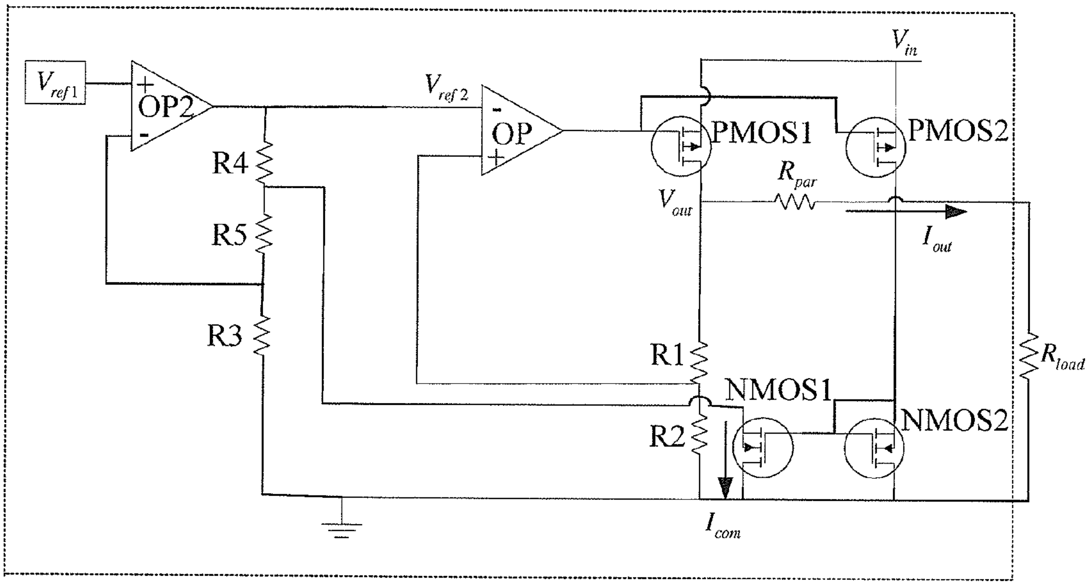
FIG. 5*a* and FIG. 5*b* are schematic structural diagrams of a device according to another embodiment of the present invention.

As shown in FIG. 5*a*, this embodiment provides a power supply circuit, where a compensation circuit is connected to an input end of a voltage output device, and is configured to generate a compensation voltage. The compensation voltage is then loaded onto the input end of the voltage output device, so as to further affect a voltage of an output end of the voltage output device. In this way, an increased voltage of the output end of the voltage output device may offset a voltage drop generated by a parasitic resistance, so that a voltage obtained at an input end of a load is equal to or approximately equal to a desired rated output voltage.

Specifically, the power supply circuit in this embodiment includes a voltage output device, an equivalent parasitic resistance connecting the voltage output device and an external load, and a compensation circuit. The voltage output device is formed by an operational amplifier OP and a first PMOS transistor. The operational amplifier OP includes a positive input end, a negative input end, and an output end. A grid electrode of the first PMOS transistor is connected to the output end of the operational amplifier OP, a source electrode of the first PMOS transistor is connected to a power supply voltage $V_{in}$, a drain electrode of the first PMOS transistor is connected to the positive input end of the operational amplifier OP through a resistance R1, and the positive input end of the operational amplifier OP is further grounded through the resistance R1. The negative input end of the operational amplifier OP is connected to a reference voltage. It can be seen that, when a voltage at the negative input end of the operational amplifier OP is increased by a certain value, a voltage at the positive input end of the operational amplifier OP is also increased by a certain value, so that a voltage output by the drain electrode of the first PMOS transistor is increased by a certain value. In this embodiment, the parasitic resistance is still represented by $R_{par}$. The drain electrode of the first PMOS transistor (PMOS1) is connected to a load $R_{load}$ through the parasitic resistance $R_{par}$, and it is assumed that a current flowing through the parasitic resistance $R_{par}$ is $I_{out}$ when the power supply circuit works.

The compensation circuit is formed by a second PMOS transistor, a first NMOS transistor, a second NMOS transistor, a reference voltage $V_{ref1}$ providing device, a second operational amplifier OP2, a third resistance R3, a fourth resistance R4, and a fifth resistance R5.

The first PMOS transistor (PMOS1), the second PMOS transistor (PMOS2), the first NMOS transistor (NMOS1) and the first NMOS transistor (NMOS1) are all in a saturation area. The second PMOS transistor (PMOS2) and the first PMOS transistor (PMOS1) form a current mirror. A source electrode of the second PMOS transistor (PMOS2) is connected to the power supply voltage $V_{in}$, and a grid electrode of the second PMOS transistor (PMOS2) is connected to the grid electrode of the first PMOS transistor (PMOS1). A drain electrode of the second PMOS transistor (PMOS2) is connected to a grid electrode of the first NMOS transistor (NMOS1) and a source electrode and a grid electrode of the second NMOS transistor (NMOS2) respectively, a drain electrode of the first NMOS transistor (NMOS1) and a drain electrode of the second NMOS transistor (NMOS2) are both grounded, and then the first NMOS transistor (NMOS1) and the second NMOS transistor (NMOS2) from a current mirror. A source electrode of the first NMOS transistor (NMOS1) is connected to an output end of the second operational amplifier OP2 through the fourth resistance R4. The output end of the second operational amplifier OP2 outputs a reference voltage $V_{ref2}$ to a negative input end of the operational amplifier OP, and the source electrode of the first NMOS transistor (NMOS1) is grounded through the fifth resistance R5 and the third resistance R3 connected in series. The negative input end of OP2 is connected to a central point between the fifth resistance R5 and the third resistance R3, and is grounded through the third resistance R3. The output end of OP2 is connected to $V_{ref2}$ of the negative input end of OP.

A width-to-length ratio of the second PMOS transistor (PMOS2) is K times a width-to-length ratio of the first PMOS transistor (PMOS1), and therefore, a drain-source current flowing through the second PMOS transistor (PMOS2) is K times a drain-source current flowing through the first PMOS transistor (PMOS1). Because the current flowing through the parasitic resistance $R_{par}$ is much greater than a current flowing through R1, the drain-source current of the second PMOS transistor (PMOS2) may be approximately equal to the current $I_{out}$ flowing through the parasitic resistance $R_{par}$. The drain-source current flowing through the first PMOS transistor (PMOS1) is $I_{out}$, and therefore, a current flowing through the second PMOS transistor (PMOS2) is $K \times I_{out}$. A width-to-length ratio of the first NMOS transistor (NMOS1) is J times a width-to-length ratio of the second NMOS transistor (NMOS2), and therefore, a drain-source current flowing through the first NMOS transistor (NMOS1) is J times a drain-source current flowing through the second NMOS transistor (NMOS2). Because the current flowing through the parasitic resistance $R_{par}$ is much greater than the current flowing through R1, the drain-source current of the second PMOS transistor (PMOS2) may be approximately equal to the current $I_{out}$ flowing through the parasitic resistance $R_{par}$. A current flowing through the second NMOS transistor (NMOS2) is $K \times I_{out}$, and therefore, a current flowing through the first NMOS transistor (NMOS1) is $K \times J \times I_{out}$. It is preset that $J \times K = R_{par} \times R2/[(R1+R2) \times R4]$, where J and K are natural numbers, $R_{par}$ is a resistance value of the parasitic resistance, R1 is a resistance value of the first resistance, R2 is a resistance value of the second resistance, and R4 is a resistance value of the fourth resistance. It is assumed that during working, a voltage at the central point between the fifth resistance R5 and the third resistance R3 is $V_{ref}$, and $V_{ref} = V_{ref2}$.

As shown in FIG. 5*a*, when the compensation circuit is added, and an effect of the parasitic resistance $R_{par}$ is not considered, a drain voltage of the first PMOS transistor (PMOS1) is: $V_{ref2} \times [(R1+R2)/R2]$, where $V_{ref2} = V_{ref1} V_{ref1} \times (R4+R5)/R3 + K \times J \times I_{out} \times R4$. Therefore, when the compensation circuit is added, and the effect of the parasitic resistance $R_{par}$ is not considered, the drain voltage of the first PMOS transistor (PMOS1) is: $(R1+R2) \times (R3+R4+R5) \times V_{ref1}/(R2 \times R3) + (R1+R2) \times K \times J \times I_{out} \times R4/R2$. Because it is preset that $J \times K = R_{par} \times R2/[(R1+R2) \times R4]$, the drain voltage of the first PMOS transistor (PMOS1) is increased by $(R1+R2) \times K \times J \times I_{out} \times R4/R2$, that is, increased by $I_{out} \times R_{par}$. When the effect of the parasitic resistance $R_{par}$ is considered, that is, the voltage drop generated by $R_{par}$ is $I_{out} \times R_{par}$, a value of the drain voltage of the first PMOS transistor (PMOS1) increased through the compensation circuit is equal to the voltage drop generated by $R_{par}$, and after the increased voltage and the voltage drop are offset, a voltage of the load $R_{load}$ is: $(R1+R2) \times (R3+R4+R5) \times V_{ref1}/(R2 \times R3)$. It can be seen that, in the power supply circuit, an effect of $R_{par}$ on load regulation is reduced by setting the compensation circuit.

Optionally, the compensation voltage is loaded onto the input end of the voltage output device, the compensation circuit may include only the fourth resistance R4 and a compensation current generation circuit (the second PMOS transistor, the first NMOS transistor, the second NMOS transistor, the reference voltage $V_{ref1}$ providing device, and the second operational amplifier OP2), and the compensation current generation circuit is connected to the input end of the voltage output device through the fourth resistance R4. The compensation current generation circuit (the second PMOS transistor, the first NMOS transistor, the second NMOS transistor, the reference voltage $V_{ref1}$ providing device, and the second operational amplifier OP2) is configured to generate a compensation current having a third proportional relation with the current flowing through the parasitic resistance. The compensation current generates the compensation voltage after flowing through the fourth resistance R4, and according to a preset fourth proportional relation between resistance values of the parasitic resistance and the fourth resistance R4, an output voltage obtained by the voltage output device according to an input compensation voltage is roughly equal to a voltage generated at two ends of the parasitic resistance. In the preceding embodiment, the preset proportional relation between the resistance values of the parasitic resistance and the fourth resistance R4 is: $J \times K = R_{par} \times R2/[(R1+R2) \times R4]$, and the output voltage obtained by the voltage output device according to the compensation voltage is: $K \times J \times I_{out} \times R4$.

Figure 5B:
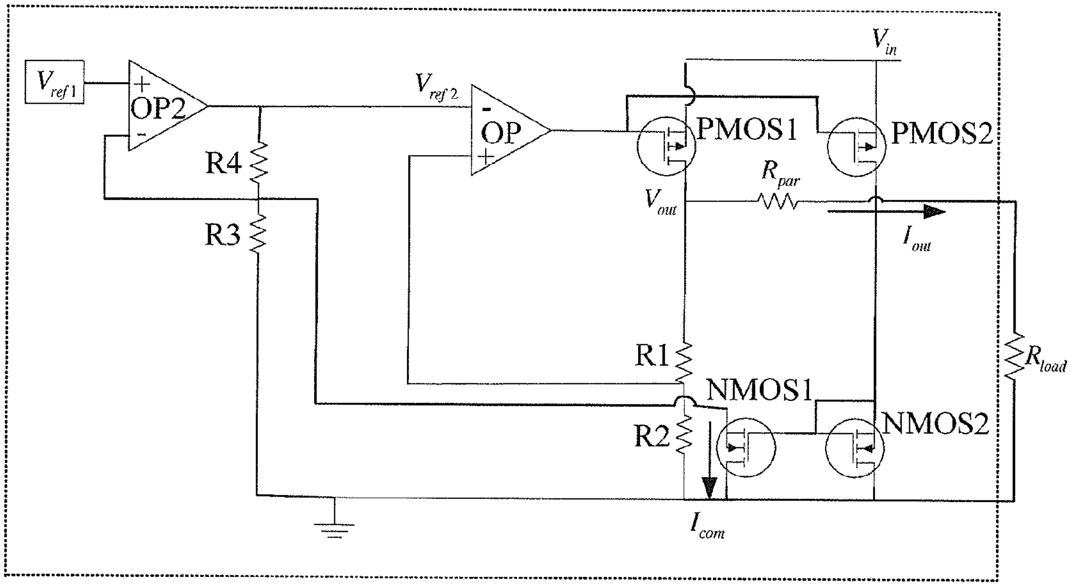

In comparison with FIG. 5*a*, FIG. 5*b* does not include the fifth resistance R5. It can be seen that, after the compensation circuit is added, and the effect of the parasitic resistance $R_{par}$ is not considered, the drain voltage of the first PMOS transistor (PMOS1) is: $V_{ref2} \times [(R1+R2)/R2]$, where $V_{ref2} = V_{ref1} + V_{ref1} \times (R4/R3) + K \times J \times I_{out} \times R4$, and therefore, $V_{out} = (R1+R2) \times (R3+R4) \times V_{ref1}/(R2 \times R3) + (R1+R2) \times K \times J \times I_{out} \times R4/R2$. Because $J \times K = R_{par} \times R2/[(R1+R2) \times R4]$, likewise, the value of the drain voltage of the first PMOS transistor (PMOS1) increased through the compensation circuit is equal to the voltage drop generated by $R_{par}$. In the power supply circuit, the effect of $R_{par}$ on the load regulation is reduced by setting the compensation circuit.

With a device for increasing the load regulation of the power supply according to this embodiment of the present invention, in this embodiment of the present invention, an output voltage is increased through a circuit added inside a power supply chip, so as to compensate for the voltage drop generated by the parasitic resistance, so that the load regulation of the power supply can be improved without increasing the cost of the power supply chip.

Figure 6A:
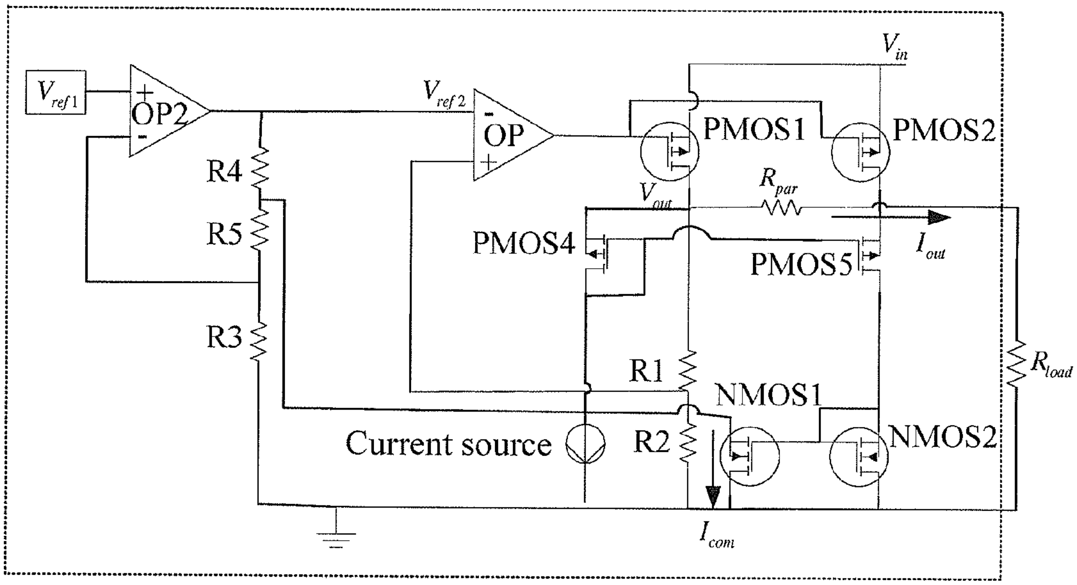
FIG. 6*a* and FIG. 6*b* are schematic structural diagrams of a device according to another embodiment of the present invention.

As shown in FIG. 6*a*, this embodiment provides a power supply circuit, and in this embodiment, a first PMOS transistor (PMOS1) and a second PMOS transistor (PMOS2) are both in a saturation area. In the power supply circuit, a compensation circuit is connected to an input end of a voltage output device, and is configured to generate a compensation voltage. The compensation voltage is then loaded onto the input end of the voltage output device, so as to further affect a voltage of an output end of the voltage output device, thus reducing an effect of $R_{par}$ on load regulation. For a specific analysis, reference may be made to FIG. 3*a*.

Figure 6B:
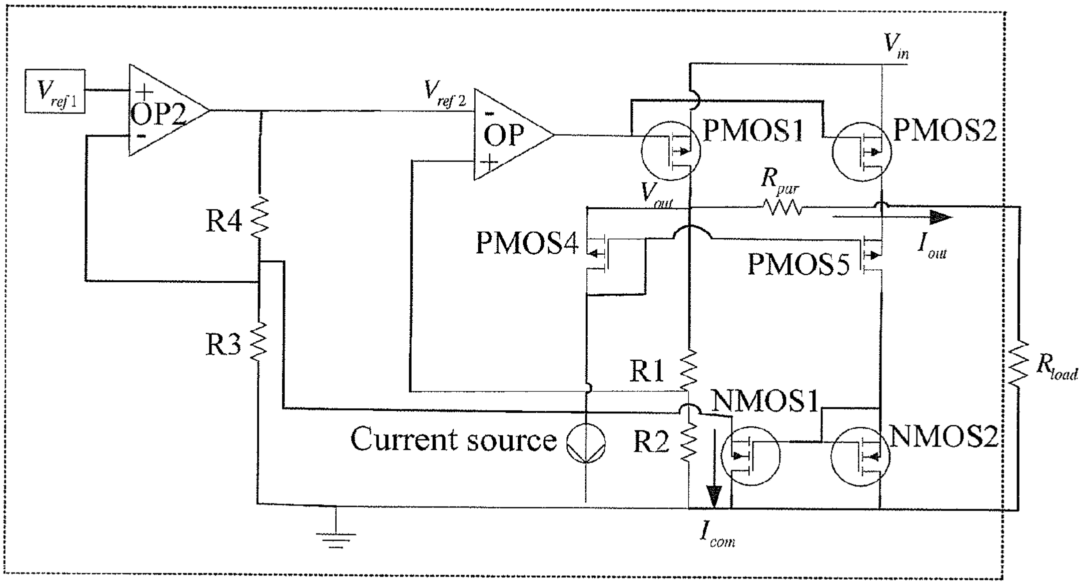

As shown in FIG. 6*a* and FIG. 6*b*, a positive input end of an operational amplifier OP is connected to a drain electrode of the first PMOS transistor (PMOS1) through R1, and the positive input end of OP is grounded through R2; and a negative input end of OP is connected to a reference voltage $V_{ref1}$, an output end of OP is connected to a grid electrode of the first PMOS transistor (PMOS1), a source electrode of the first PMOS transistor (PMOS1) is connected to an input voltage $V_{in}$, the drain electrode of the first PMOS transistor (PMOS1) is connected to an output voltage $V_{out}$, and $V_{out}$ is output to a load through a parasitic resistance $R_{par}$.

A source electrode of a first NMOS transistor (NMOS1) is connected to an output end of a second operational amplifier OP2 through a fourth resistance R4, and the source electrode of the first NMOS transistor (NMOS1) is grounded through a fifth resistance R5 connected in series with a third resistance R3 or through the third resistance R3. A negative input end of OP2 is grounded through the third resistance R3, and an output end of OP2 is connected to $V_{ref2}$ of the negative input end of OP.

A drain electrode of the second PMOS transistor (PMOS2) is connected to a source electrode of a PMOS5, a drain electrode of the PMOS5 is connected to a source electrode of a second NMOS transistor (NMOS2), the drain electrode of the first PMOS transistor (PMOS1) is connected to a source electrode of a fourth PMOS transistor (PMOS4), a drain electrode of the fourth PMOS transistor (PMOS4) is grounded through a current source, and a grid electrode of the PMOS5 is connected to a grid electrode and the drain electrode of the fourth PMOS transistor (PMOS4). Therefore, the fourth PMOS transistor (PMOS4) and the PMOS5 form a current mirror to ensure that a drain voltage of the first PMOS transistor (PMOS1) is roughly equal to a drain voltage of the second PMOS transistor (PMOS2), so that voltages at the grid electrode, the source electrode and the drain electrode of the first PMOS transistor (PMOS1) are equal to that of the second PMOS transistor (PMOS2), thus ensuring that the second PMOS transistor (PMOS2) may mirror a current of the first PMOS transistor (PMOS1).

The drain electrode of the second PMOS transistor (PMOS2) is connected to the source electrode of the second NMOS transistor (NMOS2), the first NMOS transistor (NMOS1) and the second NMOS transistor (NMOS2) form a current mirror, and the source electrode of the first NMOS transistor (NMOS1) is connected to $V_{out}$ through R1. A width-to-length ratio of the second PMOS transistor (PMOS2) is K times a width-to length ratio of the first PMOS transistor (PMOS1), and therefore, a current flowing through the second PMOS transistor (PMOS2) is K times a current flowing through the first PMOS transistor (PMOS1). Because the current flowing through the first PMOS transistor (PMOS1) is $I_{out}$, the current flowing through the second PMOS transistor (PMOS2) is $K\times I_{out}$. A width-to-length ratio of the first NMOS transistor (NMOS1) is J times a width-to-length ratio of the second NMOS transistor (NMOS2), and therefore, a current flowing through the first NMOS transistor (NMOS1) is J times a current flowing through the second NMOS transistor (NMOS2), and because the current flowing through the second PMOS transistor (PMOS2) is equal to the current flowing through the second NMOS transistor (NMOS2), the current flowing through the first NMOS transistor (NMOS1) is K×J times the current flowing through the first PMOS transistor (PMOS1), that is, $K\times J\times I_{out}$, and furthermore, $J\times K=R_{par}\times R2/[(R1+R2)\times R4]$.

As shown in FIG. 6*a*, when a compensation circuit is added, and an effect of the parasitic resistance $R_{par}$ is not considered, the drain voltage of the first PMOS transistor (PMOS1) is: $V_{ref2}\times[(R1+R2)/R2]$, where $V_{ref2}=V_{ref1}+V_{ref1}\times(R4+R5)/R3+K\times J\times I_{out}\times R4$. Therefore, $V_{out}=(R1+R2)\times(R3+R4+R5)\times V_{ref1}/(R2\times R3)+(R1+R2)\times K\times J\times I_{out}\times R4/R2$, and a voltage of a load $R_{load}$ is $V_{out}-I_{out}\times R_{par}$. Because $J\times K=R_{par}\times R2/[(R1+R2)\times R4]$, a value of the drain voltage of the first PMOS transistor (PMOS1) is increased by $I_{out}\times R_{par}$, and because a voltage drop generated by $R_{par}$ is $I_{out}\times R_{par}$, an increased value of the drain voltage of the first PMOS transistor (PMOS1) is equal to the voltage drop generated by $R_{par}$, and the voltage of the load $R_{load}$ is $(R1+R2)\times(R3+R4+R5)\times V_{ref1}/(R2\times R3)$. It can be seen that, the effect of $R_{par}$ on the load regulation is reduced.

As shown in FIG. 6*b*, when the compensation circuit is added, and the effect of the parasitic resistance $R_{par}$ is not considered, the drain voltage of the first PMOS transistor (PMOS1) is: $V_{ref2}\times[(R1+R2)/R2]$, where $V_{ref2}=V_{ref1}+V_{ref1}\times(R4/R3)+K\times J\times I_{out}\times R4$. Therefore, $V_{out}=(R1+R2)\times(R3+R4)\times V_{ref1}/(R2\times R3)+(R1+R2)\times K\times J\times I_{out}\times R4/R2$, and the voltage of the load $R_{load}$ is $V_{out}-V_{out}\times R_{par}$. Because $J\times K=R_{par}\times R2/[(R1+R2)\times R4]$, the value of the drain voltage of the first PMOS transistor (PMOS1) is increased by $I_{out}\times R_{par}$, and because the voltage drop generated by $R_{par}$ is $I_{out}\times R_{par}$, the increased value of the drain voltage of the first PMOS transistor (PMOS1) is equal to the voltage drop generated by $R_{par}$, and the voltage of the load $R_{load}$ is $(R1+R2)\times(R3+R4)\times V_{ref1}/(R2\times R3)$. It can be seen that, the effect of $R_{par}$ on the load regulation is reduced.

With a device for increasing the load regulation of the power supply according to this embodiment of the present invention, in this embodiment of the present invention, an output voltage is increased through a circuit added inside a power supply chip, so as to compensate for the voltage drop generated by the parasitic resistance, so that the load regulation of the power supply can be improved without increasing the cost of the power supply chip.

Figure 7A:
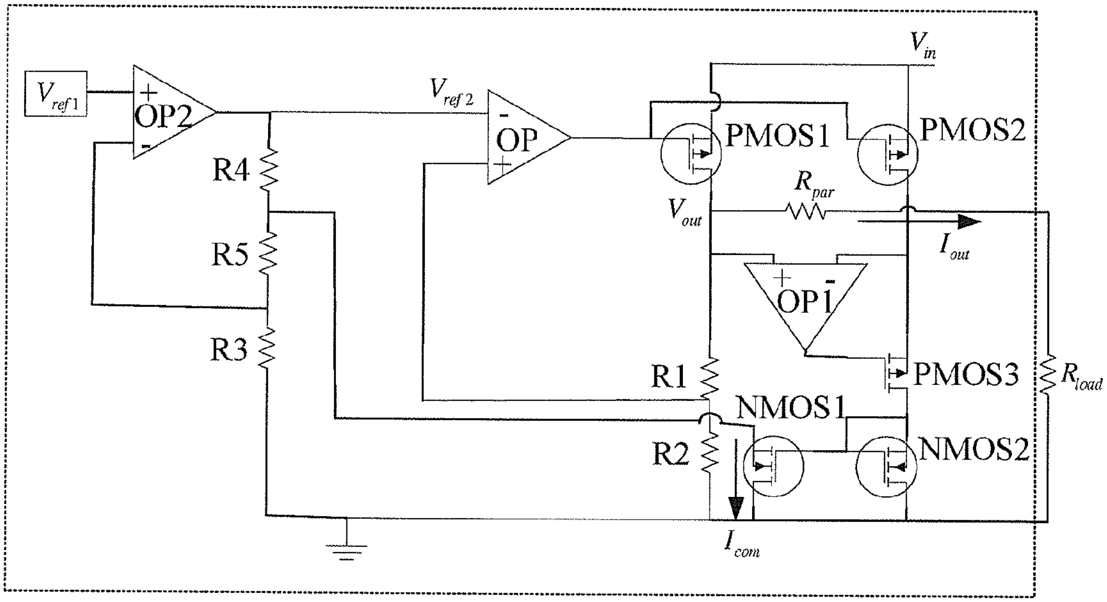
FIG. 7*a* and FIG. 7*b* are schematic structural diagrams of a device according to another embodiment of the present invention.

As shown in FIG. 7*a*, this embodiment provides a power supply circuit, and in this embodiment, a first PMOS transistor (PMOS1) and a second PMOS transistor (PMOS2) are both in a saturation area. A positive input end of an operational amplifier OP is connected to a drain electrode of the first PMOS transistor (PMOS1) through R1, and the positive input end of OP is grounded through R2, a negative input end of OP is connected to a reference voltage $V_{ref1}$, an output end of OP is connected to a grid electrode of the first PMOS transistor (PMOS1), a source electrode of the first PMOS transistor (PMOS1) is connected to an input voltage $V_{in}$, and the drain electrode of the first PMOS transistor (PMOS1) outputs a voltage to a load through a parasitic resistance $R_{par}$.

A source electrode of a first NMOS transistor (NMOS1) is connected to an output end of a second operational amplifier OP2 through a fourth resistance R4, and the source electrode of the first NMOS transistor (NMOS1) is grounded through a fifth resistance R5 connected in series with a third resistance R3 or through the third resistance R3, a negative input end of OP2 is grounded through the third resistance R3, and an output end of OP2 is connected to $V_{ref2}$ of the negative input end of OP.

A drain voltage of the first PMOS transistor (PMOS1) is connected to a positive input end of an operational amplifier OP1, a negative input end of OP1 is connected to a drain electrode of the second PMOS transistor (PMOS2) and a source electrode of a third PMOS transistor (PMOS3), an output end of OP1 is connected to a grid electrode of the third PMOS transistor (PMOS3), and a drain electrode of the third PMOS transistor (PMOS3) is connected to a source electrode of a second NMOS transistor (NMOS2). Therefore, OP1 and the third PMOS transistor (PMOS3) form a negative feedback clamping circuit to ensure that the drain voltage of the first PMOS transistor (PMOS1) is roughly equal to a drain voltage of the second PMOS transistor (PMOS2), so that voltages at the grid electrode, the source electrode and the drain electrode of the first PMOS transistor (PMOS1) are equal to that of the second PMOS transistor (PMOS2), thus ensuring that the second PMOS transistor (PMOS2) may mirror a current of the first PMOS transistor (PMOS1).

The drain electrode of the second PMOS transistor (PMOS2) is connected to the source electrode of the second NMOS transistor (NMOS2), the first NMOS transistor (NMOS1) and the second NMOS transistor (NMOS2) form a current mirror, and the source electrode of the first NMOS transistor (NMOS1) is connected to $V_{out}$ through R1. A width-to-length ratio of the second PMOS transistor (PMOS2) is K times a width-to length ratio of the first PMOS transistor (PMOS1), and therefore, a current flowing through the second PMOS transistor (PMOS2) is K times a current flowing through the first PMOS transistor (PMOS1). Because the current flowing through the first PMOS transistor (PMOS1) is $I_{out}$, the current flowing through the second PMOS transistor (PMOS2) is $K\times I_{out}$. A width-to-length ratio of the first NMOS transistor (NMOS1) is J times a width-to-length ratio of the second NMOS transistor (NMOS2), a current flowing through the first NMOS transistor (NMOS1) is J times a current flowing through the second NMOS transistor (NMOS2), and the current flowing through the second PMOS transistor (PMOS2) is equal to the current flowing through the second NMOS transistor (NMOS2), and therefore, the current flowing through the first NMOS transistor (NMOS1) is K×J times the current flowing through the first PMOS transistor (PMOS1), that is, $K \times J \times I_{out}$, and furthermore, $J \times K = R_{par} \times R2/[R1+R2) \times R4]$.

As shown in FIG. 7*a*, when a compensation circuit is added, and an effect of the parasitic resistance $R_{par}$ is not considered, the drain voltage of the first PMOS transistor (PMOS1) is: $V_{ref2} \times [(R1+R2)/R2]$, where $V_{ref2} = V_{ref1} + V_{ref1} \times (R4+R5)/R3 + K \times J \times I_{out} \times R4$. Therefore, $V_{out} = (R1+R2) \times (R3+R4+R5) \times V_{ref1}/(R2 \times R3) + (R1+R2) \times K' J \times I_{out} \times R4/R2$, and a voltage of a load $R_{load}$ is $V_{out} - I_{out} \times R_{par}$. Because $J \times K = R_{par} \times R2/[(R1+R2) \times R4]$, the drain voltage of the first PMOS transistor (PMOS1) is increased by $I_{out} \times R_{par}$, and because a voltage drop generated by $R_{par}$ is $I_{out} \times R_{par}$, an increased value of the drain voltage of the first PMOS transistor (PMOS1) is equal to the voltage drop generated by $R_{par}$, and the voltage of the load $R_{load}$ is $(R1+R2) \times (R3+R4+R5) \times V_{ref1}/(R2 \times R3)$. In this way, an effect of $R_{par}$ on load regulation may be reduced.

Figure 7B:
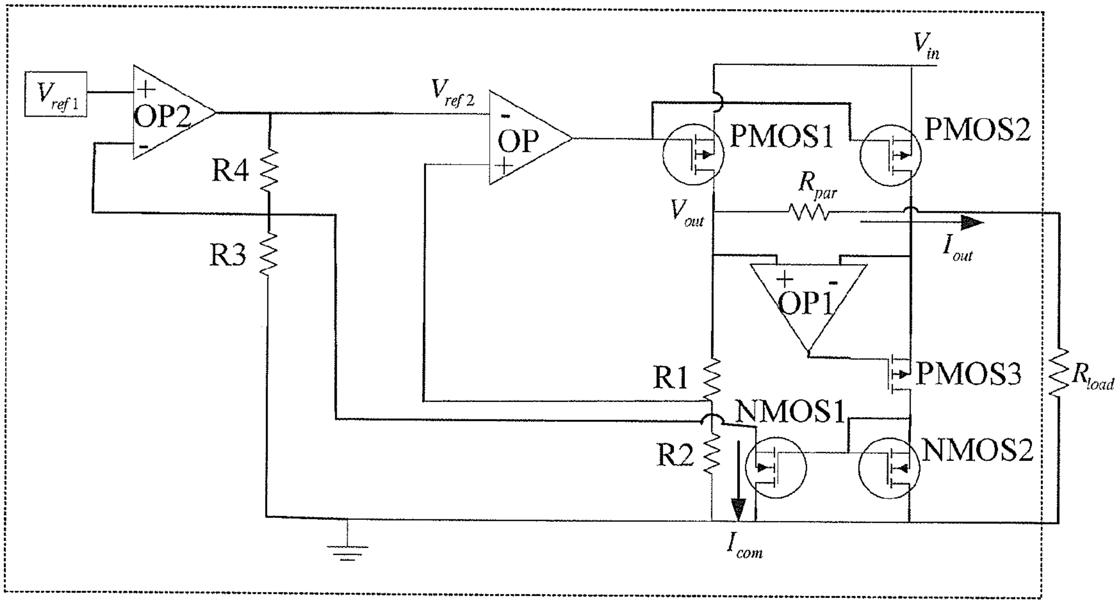

As shown in FIG. 7*b*, when the compensation circuit is added, and the effect of the parasitic resistance $R_{par}$ is not considered, the drain voltage of the first PMOS transistor (PMOS1) is: $V_{ref2}[(R1+R2)/R2]$, where $V_{ref2} = V_{ref1} + V_{ref1} \times (R4/R3) + K \times J \times I_{out} \times R4$. Therefore, $V_{out} = (R1+R2) \times (R3+R4) \times V_{ref1}/(R2 \times R3) + (R1+R2) \times K \times J \times I_{out} \times R4/R2$, and the voltage of the load $R_{load}$ is $V_{out} - I_{out} \times R_{par}$. Because $J \times K = R_{par} \times R2/[(R1+R2) \times R4]$, the drain voltage of the first PMOS transistor (PMOS1) is increased by $I_{out} \times R_{par}$, and because the voltage drop generated by $R_{par}$ is $I_{out} \times R_{par}$, the increased value of the drain voltage of the first PMOS transistor (PMOS1) is equal to the voltage drop generated by $R_{par}$, and the voltage of the load $R_{load}$ is $(R1+R2) \times (R3+R4) \times V_{ref1}/(R2 \times R3)$. In this way, the effect of $R_{par}$ on the load regulation may be reduced.

With a device for increasing the load regulation of the power supply according to this embodiment of the present invention, in this embodiment of the present invention, an output voltage is increased through a circuit added inside a power supply chip, so as to compensate for the voltage drop generated by the parasitic resistance, so that the load regulation of the power supply can be improved without increasing the cost of the power supply chip.

The preceding descriptions are merely specific embodiments of the present invention, but are not intended to limit the protection scope of the present invention. Any modification or replacement that may easily be thought of by persons skilled in the art without departing from the technical scope disclosed by the present invention should all fall within the protection scope of the present invention. Therefore, the protection scope of the present invention shall be subject to the protection scope of the claims.

What is claimed is:

1. A power supply circuit, comprising:

a voltage output device, configured to generate an output voltage;

a parasitic resistance, connected between an output end of the voltage output device and an external load, wherein two ends of the parasitic resistance generate a voltage drop; and a compensation circuit, connected to the output end of the voltage output device and configured to generate a compensation voltage, wherein the compensation voltage is loaded onto the voltage output device, so as to offset the voltage drop generated by the parasitic resistance, so that a voltage obtained at an input end of the load is roughly equal to the output voltage generated by the voltage output device;

wherein the compensation circuit comprises a first resistance and a compensation current generation circuit, the first resistance is connected between the output end of the voltage output device and the compensation current generation circuit, and the compensation current generation circuit is configured to generate a compensation current having a first proportional relation with a current flowing through the parasitic resistance, the compensation current generates the compensation voltage after flowing through the first resistance, and according to a second proportional relation between resistance values of the parasitic resistance and the first resistance, the compensation voltage is substantially equal to the voltage drop generated at the two ends of the parasitic resistance;

wherein the voltage output device comprises: a reference voltage providing device, an operational amplifier OP and a first Positive-channel Metal Oxide Semiconductor (PMOS) transistor, the operational amplifier OP comprises a positive input end, a negative input end and an output end, a source electrode of the first PMOS transistor is connected to a power supply voltage, a grid electrode of the first PMOS transistor is connected to the output end of the operational amplifier OP, and a drain electrode of the first PMOS transistor provides the output voltage of the voltage output device; and wherein the negative input end of the operational amplifier OP is connected to the reference voltage providing device so as to receive a reference voltage, the first resistance is connected in series between the positive input end of the operational amplifier OP and the drain electrode of the first PMOS transistor, the positive input end of the operational amplifier OP is further connected to a common ground end through a second resistance, and the output end of the operational amplifier OP is connected to the grid electrode of the first PMOS transistor, the source electrode of the first PMOS transistor receives an input power supply voltage, and the drain electrode of the first PMOS transistor is connected to the external load through the parasitic resistance, so as to provide an output current for the load.

2. The circuit according to claim 1, wherein the compensation current generation circuit comprises: a second PMOS transistor, a first Negative-channel Metal Oxide Semiconductor (NMOS) transistor and a second NMOS transistor;

a grid electrode of the second PMOS transistor is connected to the grid electrode of the first PMOS transistor, a source electrode of the second PMOS transistor is connected to the source electrode of the first PMOS transistor, and a drain electrode of the second PMOS transistor is connected to a source electrode of the second NMOS transistor; and a source electrode of the first NMOS transistor is connected to the drain electrode of the first PMOS transistor through the first resistance R1, a drain electrode of the first NMOS transistor is grounded, a grid electrode of the first NMOS transistor is connected to a grid electrode of the second NMOS transistor, a drain electrode of the second NMOS transistor is also grounded, a width-to-length ratio of the second PMOS transistor is K times a width-to-length ratio of the first PMOS transistor, a width-to-length ratio of the first NMOS transistor is J times a width-to-length ratio of the second NMOS transistor, wherein J×K=$R_{par}$/R1, J and K are natural numbers, $R_{par}$ is a resistance value of the parasitic resistance, and R1 is a resistance value of the first resistance.

3. A power supply circuit, comprising:

a voltage output device, configured to generate an output voltage;

a parasitic resistance, connected between an output end of the voltage output device and an external load, wherein two ends of the parasitic resistance generate a voltage drop; and a compensation circuit, connected to the output end of the voltage output device and configured to generate a compensation voltage, wherein the compensation voltage is loaded onto the voltage output device, so as to offset the voltage drop generated by the parasitic resistance, so that a voltage obtained at an input end of the load is roughly equal to the output voltage generated by the voltage output device;

wherein the compensation voltage is loaded onto an input end of the voltage output device, the compensation circuit comprises a fourth resistance and a compensation current generation circuit, and the compensation current generation circuit is connected to the input end of the voltage output device through the fourth resistance; and the compensation current generation circuit is configured to generate a compensation current having a third proportional relation with a current flowing through the parasitic resistance, the compensation current generates the compensation voltage after flowing through the fourth resistance, and according to a fourth proportional relation between resistance values of the parasitic resistance and the fourth resistance, the output voltage obtained by the voltage output device according to an input compensation voltage is substantially equal to the voltage drop generated at the two ends of the parasitic resistance.

4. The circuit according to claim 3, wherein the compensation current generation circuit comprises a second PMOS transistor, a first NMOS transistor, a second NMOS transistor, a reference voltage providing device and a second operational amplifier, and the compensation circuit further comprises a third resistance and a fifth resistance;

a source electrode of the second PMOS transistor is connected to a power supply voltage, a grid electrode of the second PMOS transistor is connected to a grid electrode of the first PMOS transistor, a drain electrode of the second PMOS transistor is connected to a grid electrode of the first NMOS transistor and a source electrode and a grid electrode of the second NMOS transistor respectively, a drain electrode of the first NMOS transistor and a drain electrode of the second NMOS transistor are both grounded, and a source electrode of the first NMOS transistor is connected to an output end of the second operational amplifier through the fourth resistance;

the source electrode of the first NMOS transistor is grounded through the fifth resistance and the third resistance connected in series, a negative input end of the second operational amplifier is connected between the fifth resistance and the third resistance, and is grounded through the third resistance, the negative input end of the second operational amplifier receives a reference voltage provided by a reference voltage providing device, and an output end of the second operational amplifier is connected to a negative input end of a first operational amplifier;

a width-to-length ratio of the second PMOS transistor is K times a width-to-length ratio of the first PMOS transistor, and a width-to-length ratio of the first NMOS transistor is J times a width-to-length ratio of the second NMOS transistor; and J×K=$R_{par}$×R2/[(R1+R2)×R4], J and K are natural numbers, $R_{par}$ is a resistance value of the parasitic resistance, R1 is a resistance value of the first resistance, R2 is a resistance value of the second resistance, and R4 is a resistance value of the fourth resistance.

* * * * *